US012567047B2

(12) United States Patent
Bauer

(10) Patent No.: US 12,567,047 B2
(45) Date of Patent: Mar. 3, 2026

(54) AUTOMATICALLY ESTABLISHING SESSIONS BETWEEN USERS AND SHOPPING CARTS

(71) Applicant: Maplebear Inc., San Francisco, CA (US)

(72) Inventor: Nathan Bauer, Union City, CA (US)

(73) Assignee: Maplebear Inc., San Francisco, CA (US)

( * ) Notice: Subject to any disclaimer, the term of this patent is extended or adjusted under 35 U.S.C. 154(b) by 230 days.

(21) Appl. No.: 17/751,525

(22) Filed: May 23, 2022

(65) Prior Publication Data

US 2023/0376923 A1 Nov. 23, 2023

(51) Int. Cl.
*G06Q 20/18* (2012.01)
(52) U.S. Cl.
CPC .................................... *G06Q 20/18* (2013.01)
(58) Field of Classification Search
CPC ...... G06Q 20/18; G06Q 20/208; G06Q 30/06; G06Q 30/0631; G06N 20/00; G07G 1/0036; G07G 1/0054; G07G 1/0063; G07G 1/0072
See application file for complete search history.

(56) References Cited

U.S. PATENT DOCUMENTS

| | | | |
|---|---|---|---|
| 10,169,778 B1 | 1/2019 | Collin et al. | |
| 2005/0027443 A1 | 2/2005 | Cato | |
| 2008/0215427 A1 | 9/2008 | Kawada et al. | |

| | | | |
|---|---|---|---|
| 2013/0085888 A1 | 4/2013 | Kim et al. | |
| 2014/0358672 A1 | 12/2014 | Sim et al. | |
| 2015/0006319 A1 | 1/2015 | Thomas et al. | |
| 2015/0242885 A1 | 8/2015 | Alsina et al. | |
| 2019/0139066 A1 | 5/2019 | Bryan et al. | |
| 2019/0236676 A1 | 8/2019 | Achan et al. | |
| 2020/0236157 A1 | 7/2020 | Rizvi et al. | |
| 2020/0275059 A1 | 8/2020 | De Bonet et al. | |

(Continued)

OTHER PUBLICATIONS

Hong-Chuan Chi, Smart Self-Checkout Carts Based on Deep Learning for Shopping Activity Recognition, Sep. 22, 2020, 21st Asia-Pacific Network Operations and Management Symposium (APNOMS), IEEE (Year: 2020).*

(Continued)

*Primary Examiner* — Aaron N Tutor
(74) *Attorney, Agent, or Firm* — Fenwick & West LLP

(57) ABSTRACT

An automated checkout system automatically establishes sessions between users and shopping carts by correlating action events with distances of the user's client device to the shopping cart. The automated checkout system determines the client device's distance from the shopping cart at timestamps when an action event occurs with respect to the shopping cart. If the distances and the action events are correlated, the system establishes a session between the user and the shopping cart. Additionally, the automated checkout system attributes target actions to recipe suggestions. The automated checkout system displays a recipe suggestion to a user on a display of a shopping cart, and identifies an item added to the shopping cart. If the added item matches an item in the set of recipes, the automated checkout system applies an attribution model that determines whether to attribute a target action that relates to the item with the recipe suggestion.

20 Claims, 7 Drawing Sheets

(56) References Cited

U.S. PATENT DOCUMENTS

| | | | |
|---|---|---|---|
| 2020/0286135 A1 | 9/2020 | Matayoshi | |
| 2021/0053604 A1 | 2/2021 | Gao et al. | |
| 2021/0142187 A1* | 5/2021 | Zilberman | G06N 20/20 |
| 2021/0272423 A1 | 9/2021 | Gao et al. | |
| 2022/0083049 A1* | 3/2022 | Kawai | G05D 1/0016 |
| 2022/0138746 A1* | 5/2022 | Rodriguez | H04L 63/0853 |
| | | | 705/43 |
| 2022/0230228 A1* | 7/2022 | Rajappan | G06Q 30/0605 |
| 2023/0368216 A1* | 11/2023 | Hagen | G06Q 30/0185 |

OTHER PUBLICATIONS

PCT International Search Report and Written Opinion, PCT Application No. PCT/US2023/063964, Aug. 18, 2023, 18 pages.
PCT Invitation to Pay Additional Fees, PCT Application No. PCT/US2023/063964, Jun. 2, 2023, 2 pages.
Jain, R., "SmartGrocer: A Context-Aware Personalized Grocery System," Rashtrasant Tukadoji Maharaj Nagpur University, Jul. 4, 2018, pp. 1-117.
Suzuki, T., et al., "Development of a Product Recommendation Method for the Real-Time Cart Context in Supermarkets by Integrating Cooking Recipes and Purchase Co-occurrences," The Review of Socionetwork Strategies, Jul. 27, 2024, pp. 1-23.
United States Patent Office, Office Action, U.S. Appl. No. 17/751,521, filed Aug. 27, 2024, 17 pages.
United States Office Action, U.S. Appl. No. 17/751,521, filed Feb. 26, 2025, 26 pages.

* cited by examiner

Detect Use of Shopping Cart
600

Cause Display of Suggestion
610

Identify Item Added to Storage Area
620

Detect Target Action
630

Match Identified Item to Recipe Item
640

Attribute Target Action to Recipe Suggestion
650

Receive Device Sensor Data
700

Receive Cart Sensor Data
710

Detect Action Events
720

Determine Distances from Shopping Cart to Client Device
730

Establish Session between User and Shopping Cart
740

Assign Session Identifier to Shopping Cart and User
750

AUTOMATICALLY ESTABLISHING SESSIONS BETWEEN USERS AND SHOPPING CARTS

BACKGROUND

Automated checkout systems allow a customer at a brick-and-mortar store to complete a checkout process for items without having to go through a cashier. These systems may allow users to complete a checkout process through a shopping cart that a user uses to carry items. However, conventional automated checkout systems often require a user to sign-in through the shopping cart. This additional step to use the shopping cart makes the shopping cart interface more difficult and time-consuming for the user to utilize, and it may also reduce the likelihood that a user will create a session on the cart. Additionally, by waiting for the user to manually input credentials, the shopping cart wastes computing resources and battery life while standing idly during this process. Thus, conventional automated checkout systems use the computing resources of shopping carts ineffectively.

Additionally, automated checkout systems may use machine-learning models to make recommendations to users of items to procure. The automated checkout system may be benefited by attributing a user's procurement of an item to a recommendation that caused the user to procure the item. However, in the contexts of many automated checkout systems, additional recommendations may be made to a user after the user decides to procure an item. Thus, conventional attribution models often fail to properly attribute a user's procurement of an item with a recommendation. This may cause a conventional machine-learning model to provide recommendations to a user for an item that the user already planned to procure, meaning the automated checkout system wasted computing resources providing an ineffective recommendation to a user.

SUMMARY

An automated checkout system may automatically establish sessions between a user and a shopping cart based on correlations between action events and distances between the shopping cart and a client device associated with the user. The automated checkout system receives sensor data and determines a distance of a client device from a shopping cart at a set of timestamps. These timestamps may correspond to timestamps when an action event occurs, which is an event that indicates that a user has interacted with the shopping cart. For example, an item being added to a storage area of the shopping cart may be an action event detected by the automated checkout system. The automated checkout system may compare the action events to the distance of a client device corresponding to the user at the times when the action events occur to correlate the distances with the action events. If they are correlated, the automated checkout system establishes a session between the user and the shopping cart. For example, the automated checkout system may associate the user and the shopping cart with a session identifier in a database, and thereby attribute future actions that occur with respect to the shopping cart to the user.

An automated checkout system also may attribute a likelihood that a recipe suggestion corresponds to a target action performed by the user. The automated checkout system may apply a recipe suggestion to a user, which causes the user's shopping cart to display information about a recipe. The automated checkout system may also determine whether the user adds any item from the recipe to their shopping cart. If the automated checkout system determines that the user has added an item from the recipe to their shopping cart, the automated checkout system determines whether the recipe suggestion should be attributed with the user procuring the item. For example, in attributing the recipe suggestion with the user's procurement of the item, the automated checkout system may apply an attribution model to recipe data describing the recipe of the recipe suggestion, item data describing the added item, and timestamps for when the recipe suggestions was presented and when the item were added. The automated checkout system may use the attribution to update a machine-learning model to more effectively select recipe suggestions to apply to users, or to attribute the user's procurement of the item to a third party who provided the recipe to the automated checkout system.

The automated checkout system improves on traditional authentication processes by enabling a user to have a session with a shopping cart through sensor data captured from the client device and the shopping cart. By automatically establishing a session between a user and a shopping cart, the automated checkout system reduces how long it takes for the user to start using a shopping cart and begin adding items to the shopping cart's storage area. Thus, the automated checkout system reduces the waste of the computing resources and battery life of the shopping cart.

Additionally, the automated checkout system described herein improves on conventional attribution models by accurately determining the point at which a recipe suggestion may influence a user to perform a target action. By identifying when the user adds the item to the storage area of the shopping cart, the automated checkout system may determine that suggestions provided after that time may not cause the user to perform a target action. Thus, the automated checkout system can more accurately attribute the target action to the suggestion, which can allow the automated checkout system to more easily identify and provide effective suggestions to users. Therefore, the automated checkout system more effectively uses computing resources to provide suggestions to users by more accurately targeting users for whom the recipe suggestions will actually cause a change in behavior.

DETAILED DESCRIPTION

Example System Environment for Automated Checkout System

Figure 1:
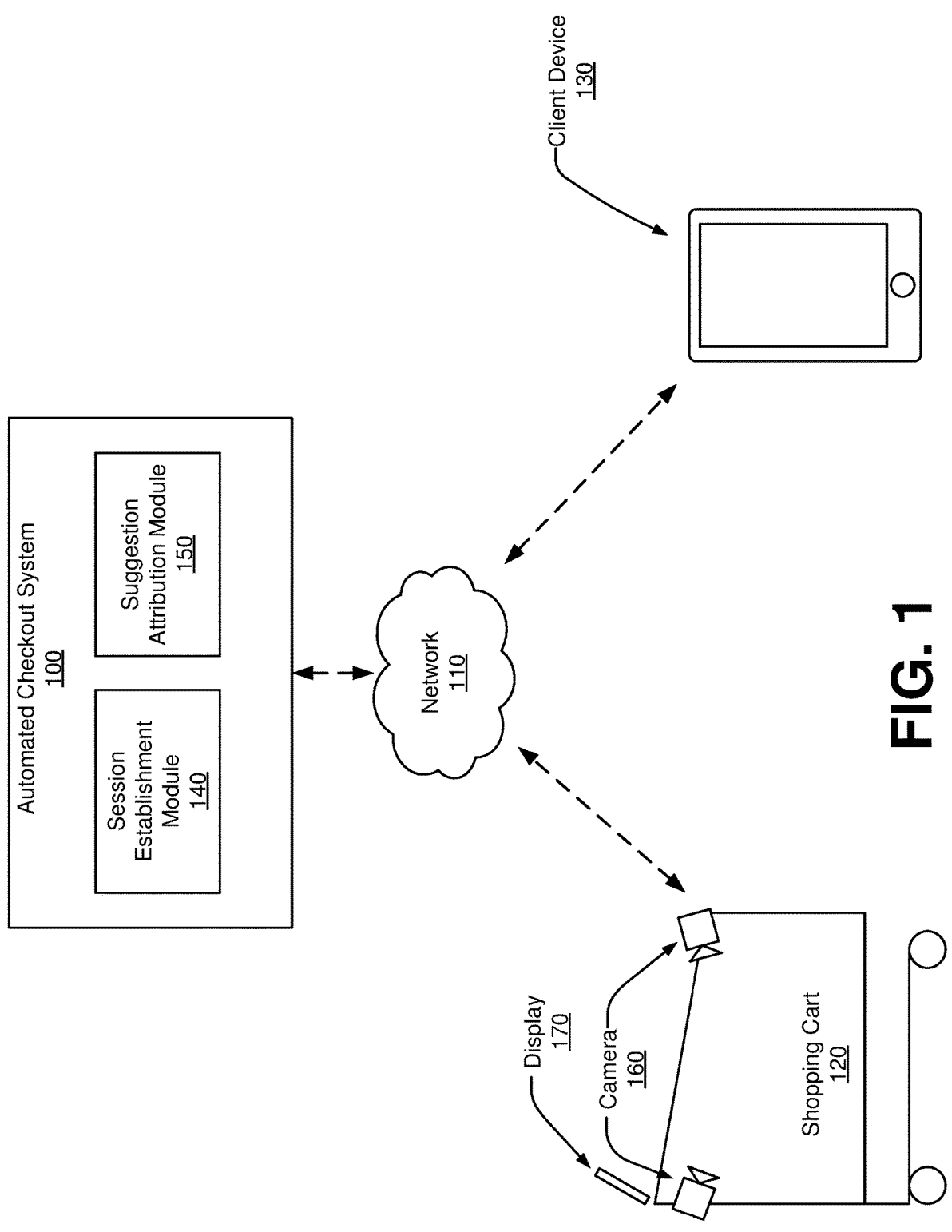
FIG. 1 illustrates an example system environment for an automated checkout system 100, in accordance with some embodiments.

FIG. 1 illustrates an example system environment for an automated checkout system 100, in accordance with some embodiments. The system environment illustrated in FIG. 1 includes an automated checkout system 100, a network 110, a shopping cart 120, and a client device 130. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

The automated checkout system 100 allows a customer at a brick-and-mortar store to complete a checkout process in which items are scanned and paid for without having to go through a human cashier. The automated checkout system 100 receives data describing a user's shopping trip in a store and generates a shopping list based on items that the user has selected. For example, the automated checkout system 100 may receive image data from a shopping cart 120 and may determine, based on the image data, which items the user has added to their cart. When the user indicates that they are done shopping at the store, the automated checkout system 100 facilitates a transaction between the user and the store for the user to purchase the items that they have selected.

The automated checkout system 100 may include a session establishment module 140. The session establishment module 140 establishes a session between a client device 130 and a shopping cart 120. A session is an association of the shopping cart 120 with the client device 130 such that actions taken with respect to the shopping cart 120 are associated with a user corresponding to the client device 130. For example, if a session is established between a shopping cart 120 and a client device 130, the automated checkout system 100 may associate items added to a storage area of the shopping cart 120 with the user corresponding to the client device 130 so that the user is charged for the items. The session establishment module 140, in accordance with some embodiments, is described in further detail below with regards to FIG. 2.

The automated checkout system may include a suggestion attribution module 150. The suggestion attribution module 150 uses an attribution model to determine whether to attribute a target action to a recipe suggestion. Specifically, the suggestion attribution module 150 identify an item that has been added to the shopping cart, determine whether it matches with an item in a set of items for a recipe suggestion, and then determine whether to attribute the recipe suggestion with the user adding the item to the storage area of the shopping cart. The suggestion attribution module 150, in accordance with some embodiments, is described in further detail below with regards to FIG. 3.

As noted above, while the automated checkout system 100 is depicted in FIG. 1 as separate from the shopping cart 120 and the client device 130, some or all of the functionality of the automated checkout system 100 may be performed by the shopping cart 120 or the client device 130. For example, the shopping cart 120 or the client device 130 may store a user's shopping list and update the shopping list based on data gathered by the shopping cart 120 or the client device 130.

A shopping cart 120 is a vessel that a user can use to hold items as the user travels through a store. The shopping cart 120 may include one or more cameras 160 that capture image data of the shopping cart's basket. The image data captured by the cameras 160 may be used by the automated checkout system 100 to identify items that the user adds to the shopping cart 120 and to update the user's shopping list as the user shops at the store.

The shopping cart 120 includes a display 170 through which the user can interact with the automated checkout system 100. For example, the user can use a user interface presented on the display 170 to adjust the items in their shopping list or to provide payment information for a checkout process. Additionally, the automated checkout system 100 may instruct the display 170 to present a recipe suggestion to a user.

A user can also interact with the automated checkout system 100 through a client device 130. The client device 130 can be a personal or mobile computing device, such as a smartphone, a tablet, a laptop computer, or desktop computer. In some embodiments, the client device 130 executes a client application that uses an application programming interface (API) to communicate with the automated checkout system 100 through the network 110.

The user may interact with the shopping cart 120 or the automated checkout system 100 through the client device 130. For example, the user may use the client device 130 to capture image data of item that the user is selecting for purchase, and the client device 130 may provide the image data to the automated checkout system 100 to identify the items that the user is selecting. Additionally, the user may use the client device 130 to adjust their shopping list and the client device 130 may instruct the automated checkout system 100 to make the adjustments to the shopping list indicated by the user.

In some embodiments, a user who interacts with the shopping cart 120 or the client device 130 may be a shopper for an online concierge system. The shopper is a user who collects items from a store on behalf of a user of the online concierge system. For example, a user may submit a list of items that they would like to purchase. The online concierge system may transmit that list to a shopping cart 120 or a client device 130 used by a shopper. The shopper may use the shopping cart 120 or the client device 130 to add items to the user's shopping list. When the shopper has gathered the items that the user has requested, the shopper may perform a checkout process through the shopping cart 120 or client device 130 to charge the user for the items. U.S. Pat. No. 11,195,222, entitled "Determining Recommended Items for a Shopping List" and issued Dec. 7, 2021 describes online concierge systems in more detail, and the contents of this patent are incorporated by reference herein in their entirety.

The shopping cart 120 and client device 130 can communicate with the automated checkout system 100 via the network 110, which may comprise any combination of local area and wide area networks employing wired or wireless communication links. In some embodiments, the network 110 uses standard communications technologies and protocols. For example, the network 110 includes communication links using technologies such as Ethernet, 802.11, world-wide interoperability for microwave access (WiMAX), 3G, 4G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 110 may be represented using any format, such as hypertext markup language (HTML) or extensible markup language (XML). In some embodiments, all or some of the communication links of the network 110 may be encrypted. In some embodiments, the network 110 may include Bluetooth or near-field communication (NFC) technologies or protocols.

Example Session Establishment Module

Figure 2:
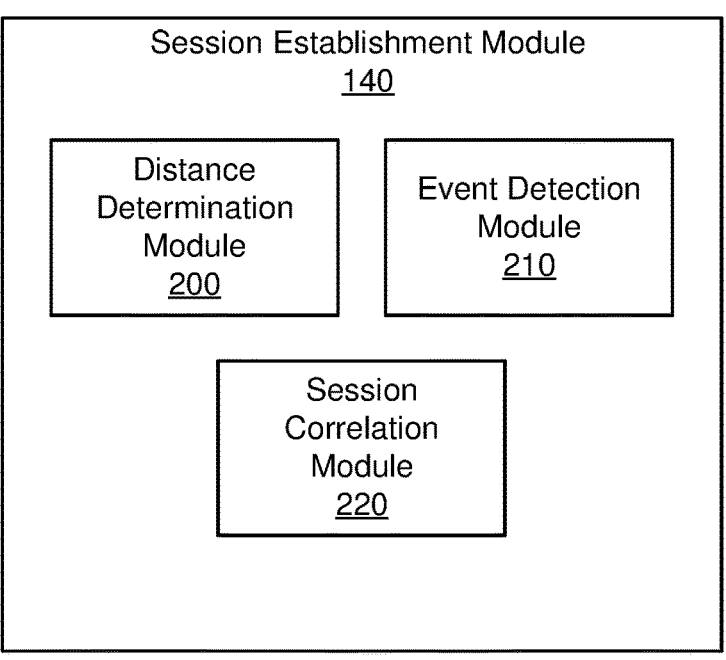
FIG. 2 illustrates an example system architecture for a session establishment module 140, in accordance with some embodiments.

FIG. 2 illustrates an example system architecture for a session establishment module 140, in accordance with some embodiments. Alternative embodiments may include more, fewer, or different components from those illustrated in FIG. 2, and the functionality of each component may be divided between the components differently from the description below. Additionally, the session establishment module 140 illustrated in FIG. 2 may be the same session establishment module 140 illustrated in FIG. 1.

The distance determination module 200 determines a distance between a client device and a shopping cart. To determine the distance between the client device and the shopping cart, the distance determination module receives device sensor data from one or more sensors. The device sensor data is sensor data that describes one or more measurements of the client device. For example, the device sensor data may include GPS data, Bluetooth data, accelerometer data, WiFi data, image data, sound data, or NFC data. The one or more sensors may be coupled to the client device, the shopping cart, or to portions of a brick-and-mortar store in which the client device is located.

The distance determination module 200 additionally receives cart sensor data from one or more sensors. The cart sensor data is sensor data that describes one or more measurements of the shopping cart. For example, the cart sensor data may include GPS data, Bluetooth data, accelerometer data, WiFi data, image data, sound data, or NFC data. The distance determination module 200 may receive cart sensor data from any of the one or more sensors that generated the device sensor data. The distance determination module 200 additionally may receive cart sensor data from one or more other sensors that may be coupled to the client device, the shopping cart, or to portions of a brick-and-mortar store in which the shopping cart is located. The cart sensor data may overlap with the device sensor data, in that sensor data received from a sensor may be used as both cart sensor data and device sensor data. For example, Bluetooth data describing a strength of a Bluetooth signal between the shopping cart and the client device may be used as both cart sensor data and device sensor data.

The cart sensor data may include sensor data describing measurements of a storage area of the shopping cart. For example, the cart sensor data may include image data, depth data, weight data, or temperature data for the storage area of the shopping cart. The cart sensor data of the storage area of the shopping cart may be captured by sensors coupled to the shopping cart, sensors coupled to the client device, or sensors coupled to portions of the brick-and-mortar store.

The distance determination module 200 determines a distance between the client device and the shopping cart based on the device sensor data and the cart sensor data. The distance determination module 200 may determine the distance between the client device and the shopping cart based on absolute locations of the client device and the shopping cart. For example, the distance determination module 200 may determine an absolute location of the device and an absolute location of the cart based on GPS data describing the location of the client device and the shopping cart. The distance determination module 200 may determine the distance between these locations based on the GPS data. The distance determination module 200 also may determine the distance between the client device and the shopping cart based wireless signals between the client device and the shopping cart. For example, the distance determination module 200 may receive cart sensor data or device sensor data that includes measurements of a WiFi, Bluetooth, or NFC signal strength between the client device and the shopping cart, and may estimate the distance between the client device and shopping cart based on the signal strength.

In some embodiments, the distance determination module 200 determines a distance between a shopping cart and multiple client devices. The distance determination module 200 may receive device sensor data describing multiple client devices. The distance determination module 200 may determine the distance between each client device and the shopping cart.

The distance determination module 200 may continually determine a distance between the shopping cart and a client device. For example, the distance determination module 200 may continually update the distance between the shopping cart and the client device when the distance determination module 200 receives cart sensor data or device sensor data. The distance determination module 200 may store the distance with a timestamp of when the distance was calculated. The timestamps may correspond with when the distance determination module receives cart sensor data or device sensor data. The timestamps also may correspond to timestamps when the event detection module 210 detects an action event, as described below.

The event detection module 210 detects an action event based on cart sensor data. An action event is an event that indicates that a user has interacted with the shopping cart. For example, an action event may include an item added to the shopping cart's storage area, the shopping cart being moved, or a user interacting with a display of the shopping cart. In some embodiments, the event detection module detects an action event when weight data describing a total weight of items in the shopping cart's storage area indicates that a new item has been added to the storage area. For example, if the user adds a new item to the shopping cart, the total weight of the items in the storage area changes. If the event detection module 210 detects the change in the total weight based on cart sensor data, the event detection module 210 detects that an action event has occurred. Additionally, the event detection module 210 may receive accelerometer data describing an acceleration of the shopping cart, and may detect an action event when the accelerometer data indicates that the user is moving the shopping cart.

The event detection module 210 may store detected action events associated with a shopping cart. The event detection module 210 may store each action event with event metadata. For example, each action event may be stored with an identifier of what kind of action event the event detection module 210 detected (e.g., an item-added action event or cart-moved action event). Similarly, the event detection module 210 also may store a timestamp of when the action event was detected.

The session correlation module 220 infers whether to establish a session between a user corresponding to a client device and a shopping cart. A session is an association of the shopping cart with the user corresponding to a client device such that actions taken with respect to the shopping cart are associated with the user. For example, a user in a session with a shopping cart may be associated with any further action events that occur with regards to the shopping cart, such as the addition of an item to the shopping cart or an interaction with the display of the shopping cart. In some embodiments, the session correlation module 220 associates the user and the shopping cart with a session identifier in a session database. The session identifier may be a unique identifier of the session between the shopping cart and the user.

The session correlation module 220 establishes a session between a user and a shopping cart by correlating action events with distances between client devices and the shopping cart. For example, the session correlation module 220 may determine whether action events occur more commonly when the distance between a client device and a shopping cart is low than when the distance is high. If so, the session correlation module 220 may establish a session between the shopping cart and the user corresponding to the client device. The session correlation module 220 also may compare distances of multiple client devices to the shopping cart and determine which client device is most correlated to the action events. For example, the session correlation module 220 may determine which of a set of client devices is closest to the shopping cart when action events occur, and may establish a session between the shopping cart and the user corresponding to that client device.

The session correlation module 220 may establish a session between a user and a shopping cart based on a set of action event rules. An action event rule is a rule that specifies circumstances that indicate whether the user is using the shopping cart. For example, an action event rule may specify that a session should be established if an action event occurs while the client device is within a threshold distance of the shopping cart. In some embodiments, an action event rule may further require that a threshold number of action events occur while the client device is within the threshold distance of the shopping cart.

In some embodiments, the session correlation module 220 applies a machine-learning model (e.g., a neural network) to the action events and the distances to determine whether to establish a session between a user and a shopping cart. The machine-learning model may be trained to generate correlation scores based on action events and distances between the client device and the shopping cart. The correlation scores indicate how correlated the action events are with the distances. The machine-learning model may be trained based on a set of training examples that include distances between a shopping cart and a client device, action events, and labels indicating whether the client device is in a session with the shopping cart. In some embodiments, the machine-learning model is trained as a classifier.

The session correlation module 220 may associate actions taken with respect to the shopping cart with a user who is in a session with the shopping cart. For example, items added to a storage area of the shopping cart may be associated with the user so that the user is charged for the items. Similarly, the session correlation module 220 may use session to identify user data to use for suggesting a recipe to the user, if the user has opted into such a service.

Example Suggestion Attribution Module

Figure 3:
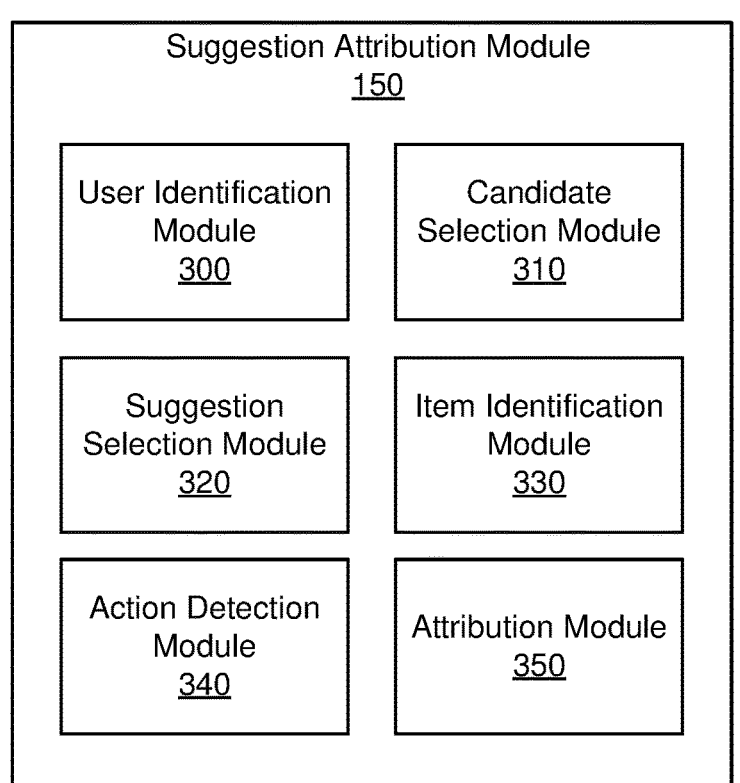
FIG. 3 illustrates an example system architecture for a suggestion attribution module 150, in accordance with some embodiments.

FIG. 3 illustrates an example system architecture for a suggestion attribution module 150, in accordance with some embodiments. Alternative embodiments may include more, fewer, or different components from those illustrated in FIG. 3, and the functionality of each component may be divided between the components differently from the description below. Additionally, the suggestion attribution module 150 illustrated in FIG. 3 may be the same suggestion attribution module 150 illustrated in FIG. 1.

The user identification module 300 identifies a user that is associated with a shopping cart. The user identification module 300 may identify a user by identifying a client device corresponding to the user. For example, the user identification module 300 may receive, from the session establishment module 140, an identifier for a client device that is in a session with a shopping cart, and may identify the user that is associated with the client device.

The candidate selection module 310 selects a set of candidate recipe suggestions for possible application to the user. A recipe is a set of instructions and products that allow a user to produce an end product. For example, a recipe for tomato sauce may include canned tomatoes, basil, garlic, parsley, and olive oil as ingredients and may include instructions for how to turn those ingredients into tomato sauce. Each recipe may be associated with a set of recipe items, which are items that the user can purchase to complete the recipe. A recipe's set of items may include specific items (e.g., an item from a particular brand or retailer) or generic items.

A recipe suggestion is a suggestion to a user of a recipe for which the user may want to purchase items. For example, for a chicken soup recipe, a recipe suggestion may suggest that the user purchase soup stock, chicken, onions, carrots, and celery. A recipe suggestion may include instructions to be transmitted to a display of a shopping cart to present the recipe to the user. For example, a recipe suggestion may include instructions to cause the display to present an image of the recipe, a title of the recipe, a description of the recipe, or the set of items that is associated with the recipe. Additionally, a recipe suggestion may include instructions to the shopping cart to display user elements that allow the user to interact with the recipe. For example, the recipe suggestion may instruct the shopping cart to display user elements that allow the user to select the recipe to be shown the set of items for the recipes, or to request an indication of where items are in the store for the user to procure.

The candidate selection module 310 selects a set of candidate recipe suggestions. The candidate selection module 310 may randomly select the set of candidate recipe suggestions or may select the candidate recipe suggestions based on some selection criteria. For example, each recipe suggestion may be associated with a popularity score indicating how popular the recipe is with users generally, and the candidate selection module 310 may only select candidate recipe suggestions with popularity scores that exceed a threshold.

The suggestion selection module 320 selects a recipe suggestion of the set of candidate recipe suggestions to apply to the user. The suggestion selection module 320 selects a recipe suggestion by generating suggestion scores for each of the candidate recipe suggestions. A suggestion score is a score that represents a measure of affinity of the user for the recipe suggestion. For example, a suggestion score may represent a likelihood that the user will follow the recipe of a recipe suggestion and will purchase items in the set of items for the recipe. The suggestion selection module 320 may generate a suggestion score for a candidate recipe suggestion by applying a suggestion scoring model to the candidate recipe suggestion. A suggestion scoring model is a machine-learning model (e.g., neural network) that is trained to generate suggestion scores for recipe suggestions. The suggestion scoring model may be applied to suggestion data describing each recipe suggestion. For example, the suggestion scoring model may be applied to the list of items associated with the recipe or certain keywords or identifiers that describe characteristics of the recipe.

The suggestion scoring model may also be trained to generate suggestion scores for recipe suggestions based on user data describing characteristics of a user. The user data may describe a user's interactions with the online concierge system, such as when the user has interacted with the automated checkout system, what kinds of interactions the user has had with the automated checkout system, how often the user interacts with the automated checkout system, or characteristics of the user's interactions with the automated checkout system. Additionally, the user data may describe demographic or personal information about the user, such as the user's name, age, gender, sex, income, contact information, location, or residence, if the user has opted to share such information under one or more applicable privacy policies.

The suggestion selection module 320 selects a recipe suggestion to apply to the user based on the suggestion scores for the candidate recipe suggestions. For example, the suggestion selection module 320 may rank the candidate recipe suggestions based on their suggestion scores and may select the recipe suggestion with the highest suggestion score. Similarly, the suggestion selection module 320 may identify which candidate recipe suggestions have suggestion scores that exceed a threshold, and randomly selects a recipe suggestion from among those candidate recipe suggestions. In some embodiments, the suggestion selection module 320 selects more than one recipe suggestion that exceeds the threshold, or selects a certain number of best candidate recipe suggestions based on a ranking of the suggestion scores of the candidate recipe suggestions.

The suggestion selection module 320 applies the selected recipe suggestion to the user. The suggestion selection module 320 may apply the selected recipe suggestion by transmitting instructions to the user's shopping cart to present the recipe on a display of the shopping cart, along with information describing the recipe. Similarly, the suggestion selection module 320 may transmit instructions to the shopping cart to present a user interface to the user that allows the user to interact with the recipe from the selected recipe suggestion. The suggestion selection module 320 may store a timestamp of when the suggestion selection module 320 applies the selected recipe suggestion to the user. For example, the suggestion selection module 320 may store a timestamp of when the suggestion selection module 320 transmits instructions to the shopping cart to apply the selected recipe suggestion or may store a timestamp of when the shopping cart displays the recipe suggestion to the user.

The item identification module 330 detects whether an item has been added to a storage area of the shopping cart and identifies the item. The item identification module 330 may detect that an item has been added to the storage area based on cart sensor data. For example, the item identification module 330 may detect a change in the total weight of the items in the cart based on weight sensor data, and determine that an item has been added. Similarly, the item identification module 330 may detect an item being added to the shopping cart based on proximity sensor data.

The item identification module 330 identifies the detected item based on cart sensor data describing the storage area of the shopping cart. The item identification module 330 may identify the item based on image data, depth data, weight data, or temperature data. In some embodiments, the item identification module 330 identifies the item in image data by applying an item recognition model to one or more images captured of the storage area of the shopping cart. For example, the detected item may be depicted in an image captured of the storage area of the shopping cart, and the item identification module 330 may apply an item recognition model to the image to identify the item. The item recognition model is a machine-learning model (e.g., a neural network) that is trained to predict an identifier for an item depicted in an image. In some embodiments, the item recognition model is trained as a classifier.

The action detection module 340 detects whether a target action occurs with regards to the item added to the storage area of the shopping cart. A target action is an action that the automated checkout system encourages the user to perform with regards to an item. For example, the target action may include the purchase of the item, requesting more details about the item from the automated checkout system, or the procurement of a related item. The action detection module 340 may detect whether a target action occurs by receiving information describing the target action. The action detection module 340 may receive the information from the client device, the shopping cart, other components of the automated checkout system, other components of the suggestion attribution module 150, or from sensors coupled to the shopping cart, the client device, or portions of the brick-and-mortar store.

The attribution module 350 determines whether to attribute the recipe suggestion with the target action. By attributing the target action to the recipe suggestion, the attribution module 350 assigns the recipe suggestion as the cause of the user performing the target action. For example, where the target action is a purchase of an item, the attribution module 350 may attribute the purchase of the item to the recipe suggestion.

The attribution module 350 applies an attribution model to the target action and the recipe suggestion to attribute the target action to the recipe suggestion. The attribution model comprises a set of attribution rules for determining whether to attribute a target action to a recipe suggestion. For example, an example attribution rule may require that the recipe suggestion be provided before the item is added to the storage area of the shopping cart for the recipe suggestion to get attribution for the target action.

In some embodiments, the attribution model comprises an attribution rule that requires that the item added to the shopping cart match with a recipe item from the set of recipe items for the recipe of the recipe suggestion. The attribution module 350 may compare the item with the set of items associated with the recipe, and may match the item with one of the items in the set. If the item matches with one of the items from the set of items, the attribution module 350 may attribute the target action to the recipe suggestion. Similarly, the attribution rule may require that more than one item from the set of items for the recipe be included in the storage area. For example, the attribution rule may set a threshold number of items from the recipe to be included in the storage area of the shopping cart for the recipe suggestion to be attributed with the target action.

In some embodiments, the attribution model includes an attribution rule that requires that the item not be a staple item for the recipe suggestion to be attributed with the target action. A staple item is an item that a user commonly procures for reasons that are unrelated to a recipe. If the item added to the shopping cart after the recipe suggestion is presented was a staple item, the attribution rule may preclude the recipe suggestion from being attributed with the target action, even if the item in the set of items for the recipe. U.S. Pat. No. 11,282,126, entitled "Learning Staple Goods for a User" and issued on Mar. 22, 2022, describes staple items in more detail and is incorporated by reference.

In some embodiments, the attribution model includes a machine-learning model (e.g., a neural network) that is trained to predict whether a recipe suggestion caused the user to perform the target action. The efficacy prediction model may be applied to information describing the target action and the recipe suggestion to generate a prediction score for the applied recipe suggestion that represents the likelihood that the recipe suggestion caused the user to perform the target action.

If the attribution module 350 attributes the target action to a recipe suggestion, the attribution module 350 may store an indication of the attribution in a database. The attribution module 350 also may provide consideration to third parties who provide recipes to the automated checkout system. If the attribution module 350 attributes a target action to recipe suggestion, the attribution module 350 may provide consideration to a third party who provided the recipe suggestion to the automated checkout system. For example, the attribution module 350 may provide a portion of the purchase revenue from an item being purchased to the third party.

Example Sensor Capture and Distance Determination

Figure 4A:
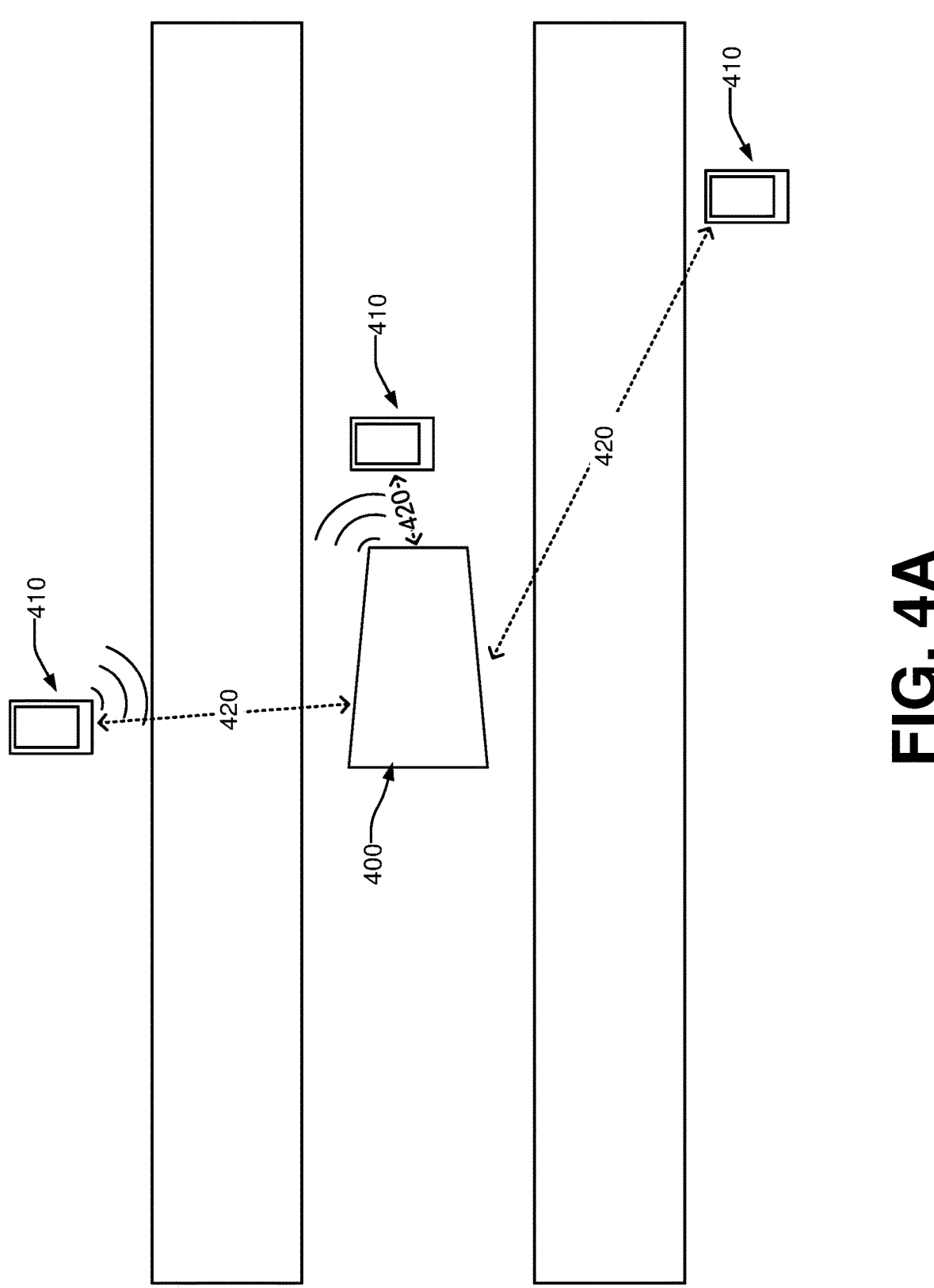
FIG. 4A illustrates sensor data being captured in a brick-and-mortar store, in accordance with some embodiments.

FIG. 4A illustrates sensor data being captured in a brick-and-mortar store, in accordance with some embodiments. The sensor data may be captured by sensors coupled to a shopping cart 400 or sensors coupled to client devices 410 held by users in the store. In some embodiments, sensors mounted in the store also capture sensor data to be used by an automated checkout system. As described above, device sensor data is sensor data that measures client devices 410 in the store, and cart sensor data is sensor data that measures the shopping cart 400. Additionally, distances 420 between the shopping cart 400 and client devices 410 may be determined based on the device sensor data and the cart sensor data.

Figure 4B:
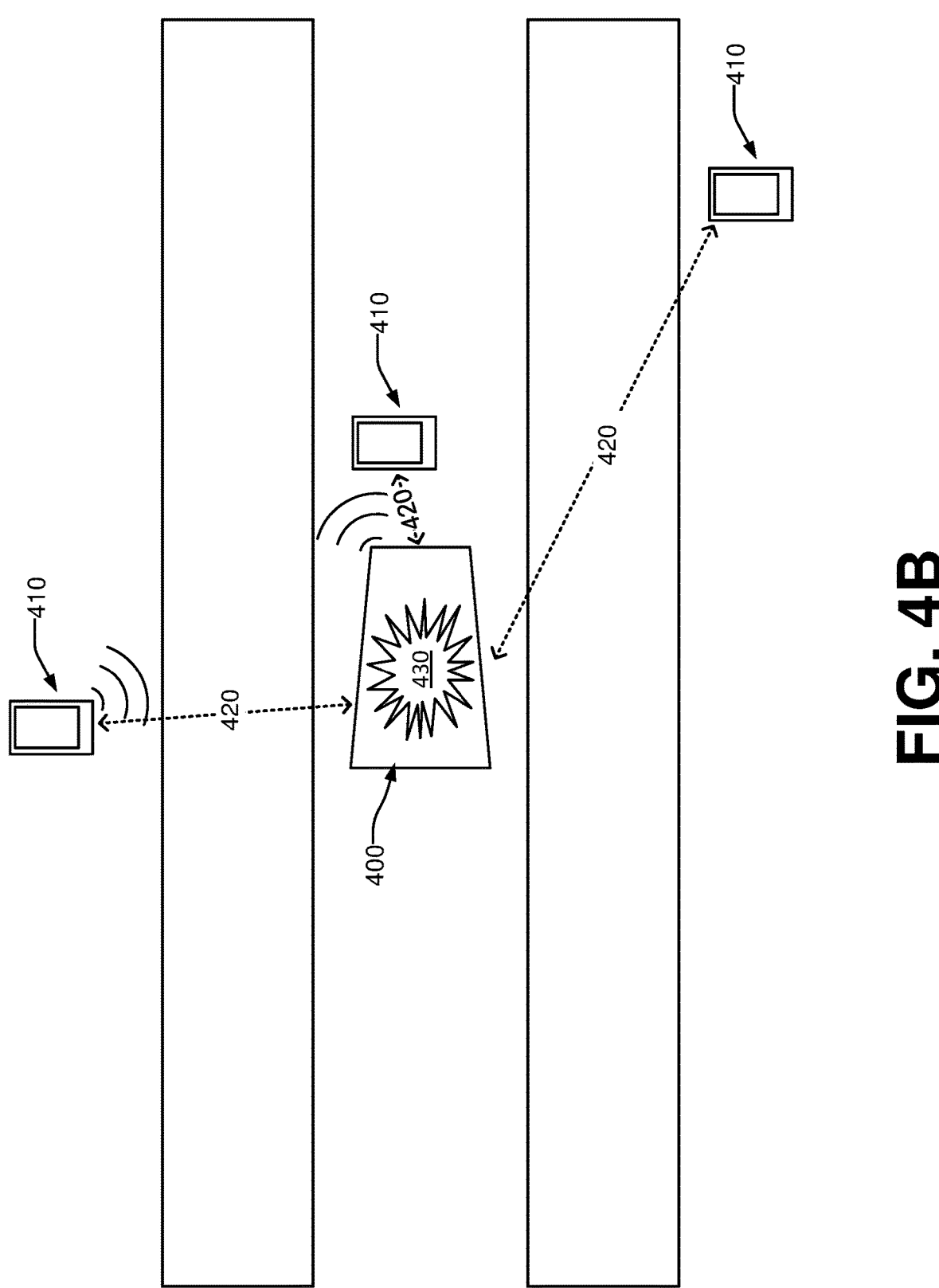
FIG. 4B illustrates an example action event 430 occurring in a brick-and-mortar store, in accordance with some embodiments.

FIG. 4B illustrates an example action event 430 occurring in a brick-and-mortar store, in accordance with some embodiments. The action event 430 may include an item being added to the shopping cart 400, the shopping cart 400 being moved, or a user interacting with a display on the shopping cart 400. The automated checkout system may compare the action event to the distances 420 of each of the client devices 410 to determine which user caused the action event 430. For example, the automated checkout system may determine that a user associated with a client device 410 that is closest to the shopping cart 400 when the action event occurs is the user that is most likely to have caused the action event 430 to occur. By correlating the distances 420 of the client devices 410 with the action event 430, automated checkout system can determine which user is using the shopping cart 400 and thereby determine which user should be in a session with the shopping cart 400.

Example User Interface for Recipe Display

Figure 5:
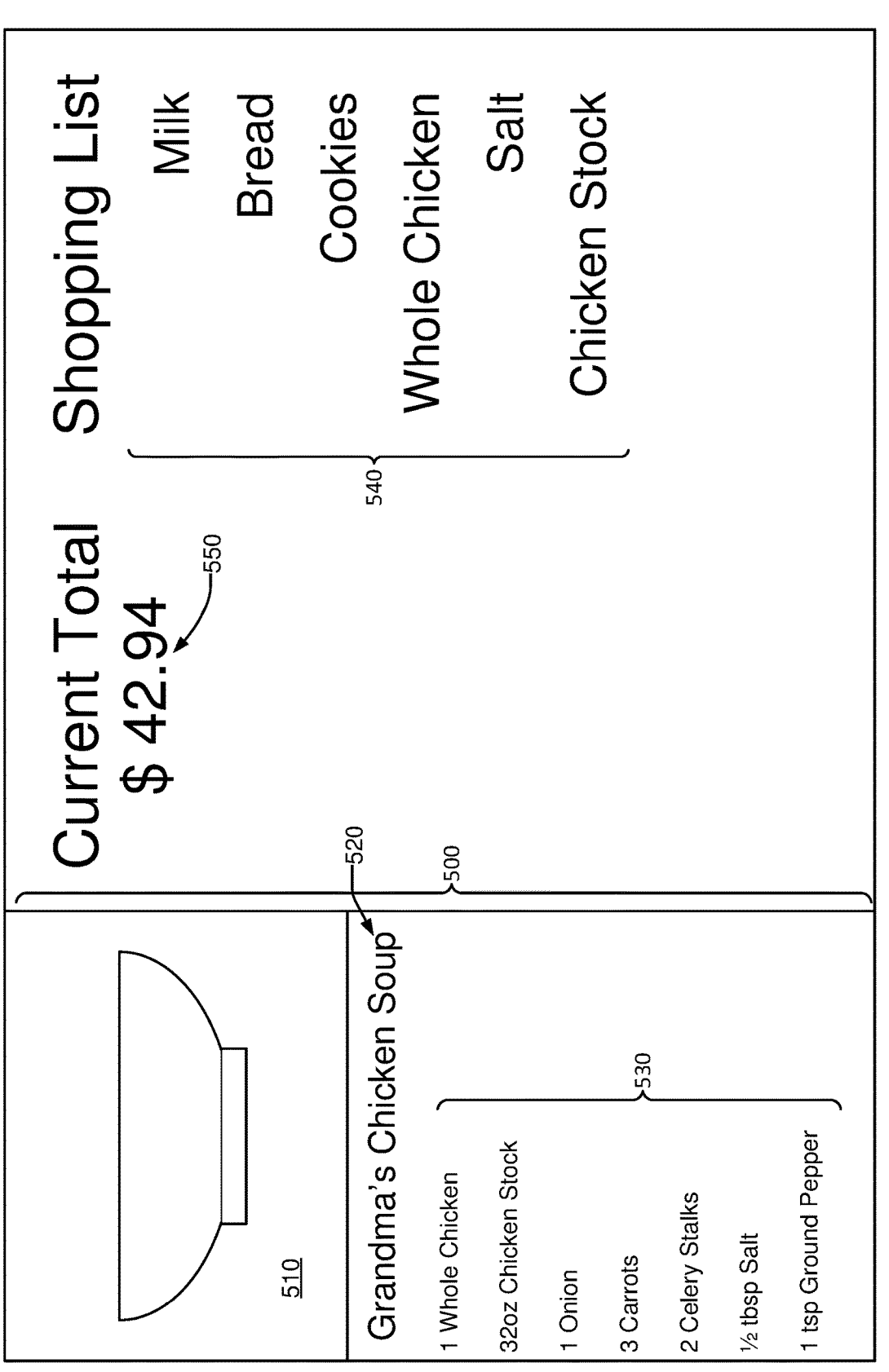
FIG. 5 illustrates an example user interface displaying a recipe when a recipe suggestion is applied to a user, in accordance with some embodiments.

FIG. 5 illustrates an example user interface displaying a recipe when a recipe suggestion is applied to a user, in accordance with some embodiments. Alternative user interfaces may include more, fewer, or different elements from those illustrated in FIG. 5, and the elements may be arranged or displayed differently from FIG. 5. The example user interface of FIG. 5 may be presented on a display of a shopping cart, or may be presented to the user on a client device corresponding to the user applied with a recipe suggestion.

The user interface presents the recipe 500 to the user with an image 510 of the recipe, the title 520 of the recipe, and a set 530 of items used to prepare the recipe. The user interface may also display a list 540 of items that the user has added to a storage area of their shopping cart and the total cost 550 of items that have been added so far. As described above, the automated checkout system may determine which items 540 the user has added to the storage area of the shopping cart due to the presentation of the recipe 500 to the user. For example, the automated checkout system may compute an efficacy score for the recipe suggestion that indicates a likelihood that the recipe suggestion caused the user to add the "whole chicken" item and the "chicken stock" item to the storage area of the shopping cart.

Example Method for Attributing Target Actions to Recipe Suggestions

Figure 6:
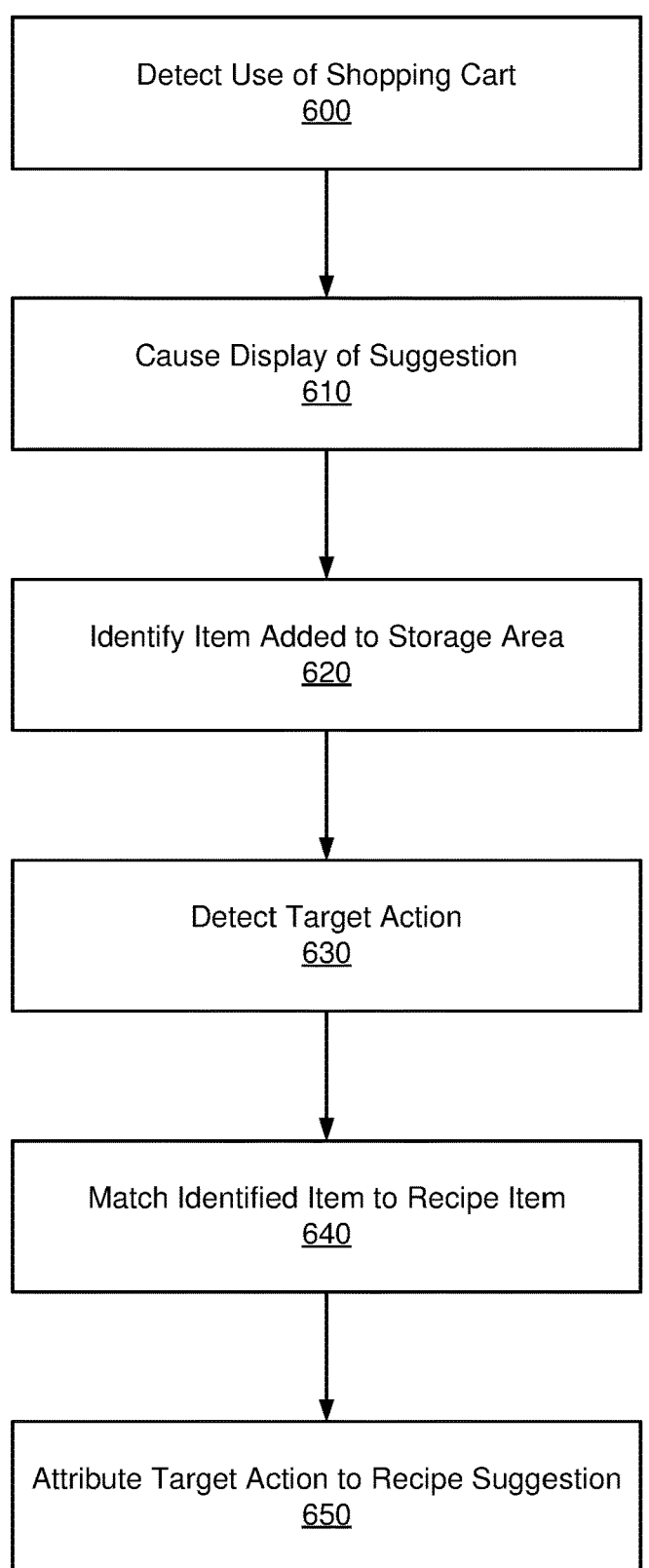
FIG. 6 is a flowchart illustrating an example method for attributing target actions to recipe suggestions, in accordance with some embodiments.

FIG. 6 is a flowchart illustrating an example method for attributing target actions to recipe suggestions, in accordance with some embodiments. Alternative embodiments may include more, fewer, or different steps and the steps may be performed in a different order from that illustrated in FIG. 6. Additionally, the method illustrated by FIG. 6 may be performed by the automated checkout system 100 illustrated in FIG. 1.

The automated checkout system detects 600 the use of a shopping cart by a user. The automated checkout system may detect the user of a shopping cart by detecting certain action events that are performed with regards to the shopping cart, such as items added to the shopping cart, movement of the shopping cart, or interacts with a display of the shopping cart.

The automated checkout system causes 610 the display of a recipe suggestion on a display of the shopping cart. For example, the automated checkout system may transmit instructions to the shopping cart to cause the shopping cart to display a recipe suggestion to the user. The recipe suggestion is a suggestion for a recipe to the user. The recipe may include a set of recipe items, which are items that are used to complete the recipe. The automated checkout system may store a first timestamp at which the recipe suggestion is displayed to the user.

The automated checkout system identifies 620 an item added to the storage area of the shopping cart. The item may be identified based on sensor data captured by one or more sensors. These sensors may be coupled to the shopping cart or the client device. The automated checkout system may store a second timestamp at which the item is added to the storage area of the shopping cart.

The automated checkout system detects 630 a target action associated with the shopping cart. The target action is an action performed by the user with regards to the shopping cart that is an action encouraged by the automated checkout system. For example, the target action may include purchasing an item, completing a checkout process, or requesting additional information about an item.

The automated checkout system matches 640 the identified item to a recipe item of the set of recipe items associated with the recipe. For example, the automated checkout system may compare an item identifier for the identified item to item identifiers for the recipe items, and determine whether the item identifiers match. If the item matches with a recipe item, the automated checkout system applies an attribution model to the identified item and the recipe suggestion to attribute 650 the target action to the recipe suggestion. The attribution model may comprise a set of attribution rules for determining whether to attribute a target action to a recipe suggestion. For example, the attribution model may compare the timestamp for when the identified item was added to the shopping cart and the timestamp for the recipe suggestion was displayed to determine whether the identified item was added after the recipe suggestion was displayed. If so, the attribution model may attribute the target action to the recipe suggestion. Similarly, the attribution model may not attribute the target action to the recipe suggestion if the identified item is a staple item.

Example Method for Establishing Sessions Between Users and Shopping Carts

Figure 7:
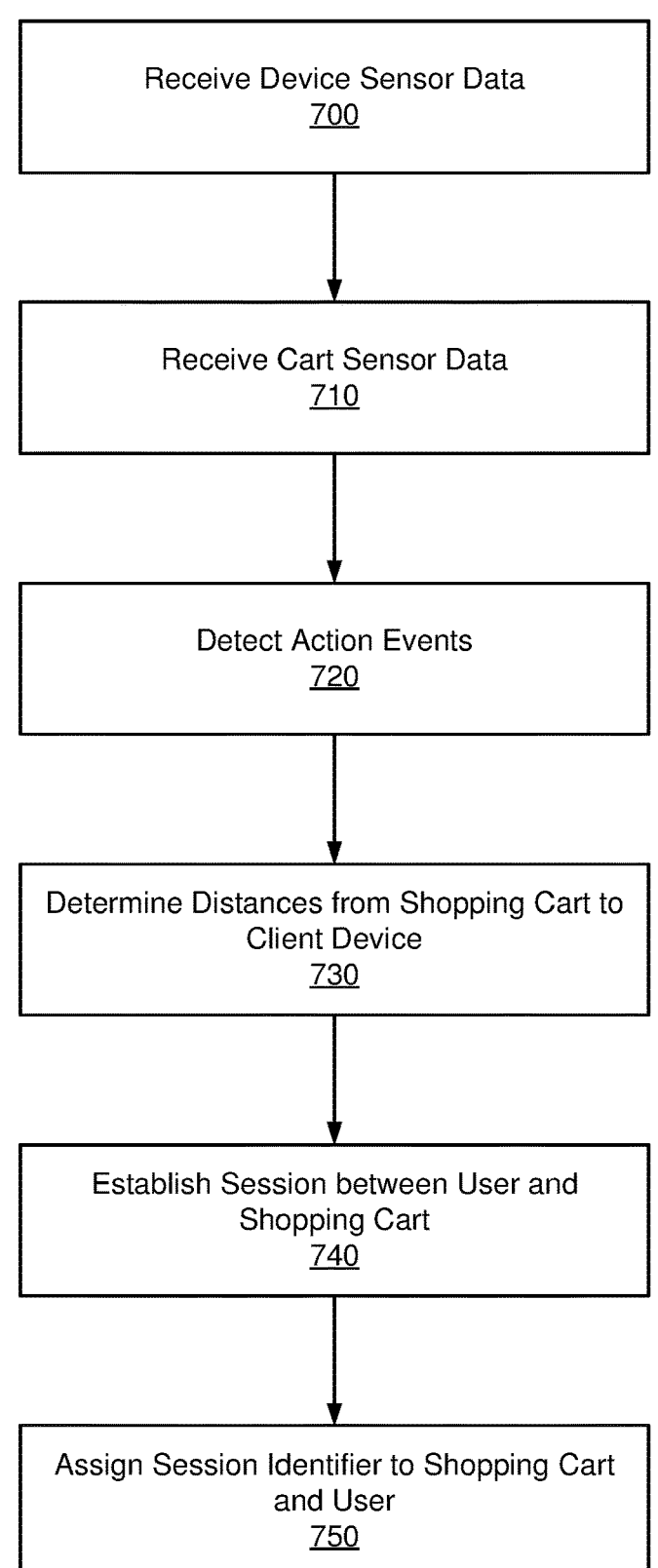
FIG. 7 is a flowchart illustrating an example method for establishing sessions between users and shopping carts, in accordance with some embodiments.

FIG. 7 is a flowchart illustrating an example method for establishing sessions between users and shopping carts, in accordance with some embodiments. Alternative embodiments may include more, fewer, or different steps and the steps may be performed in a different order from that illustrated in FIG. 7. Additionally, the method illustrated by FIG. 7 may be performed by the automated checkout system 100 illustrated in FIG. 1.

The automated checkout system receives 700 device sensor data from a first set of sensors. The device sensor data describes a set of measurements of a client device by the first set of sensors. The automated checkout system receives 710 cart sensor data from a second set of sensors. The cart sensor data describe a set of measurements of a shopping cart by the second set of sensors.

The automated checkout system detects 720 one or more action events based on the cart sensor data. Each action event indicates an action that has been taken with respect to the shopping cart. For example, an action event may include an item added to the shopping cart, the shopping cart being moved, or an interaction with a display of the shopping cart. Each action event also may be associated with a timestamp that indicates when the action event occurred.

The automated checkout system determines 730 one or more distances of the client device from the shopping cart. Each distance may be determined at one of the timestamps of an action event; in other words, the automated checkout system may determine the distance of the client device from the shopping cart at each timestamp when the automated checkout system detects an action event. The automated checkout system may determine the one or more distances based on the device sensor data and the cart sensor data.

The automated checkout system establishes 740 a session between the user corresponding to the client device and the shopping cart. The session may associate future actions taken with regards to the shopping cart while the session exists with the user. The automated checkout system may establish the session by correlating the one or more distances with the one or more action events. For example, the automated checkout system may determine whether the action events are more likely to occur when the client device is within a threshold distance of the client device. If so, the automated checkout system may establish a session because the action events and the distances are correlated.

The automated checkout system assigns 750 a unique session identifier for the established session in a session database. The automated checkout system may create a new session identifier for the established session, and may associate the session identifier with an identifier for the user and an identifier for the shopping cart. The automated checkout system may thereby use the session identifier to associate additional actions taken with regards to the shopping cart with the user.

OTHER CONSIDERATIONS

The foregoing description of the embodiments has been presented for the purpose of illustration; it is not intended to be exhaustive or to limit the scope of the disclosure. Many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The weights may be stored on one or more computer-readable media, and are used by a system when applying the machine-learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. A method comprising:
at a computer system comprising a processor and a non-transitory memory:
receiving device sensor data describing a set of measurements of a client device by a first set of sensors, wherein the client device is associated with a user;
receiving cart sensor data describing a set of measurements of a shopping cart by a second set of sensors coupled to the shopping cart;
detecting a plurality of action events based on the cart sensor data, wherein each action event indicates an action has been taken with respect to the shopping cart, and wherein each action event is associated with a timestamp;
determining a plurality of distances by, for each of the plurality of action events, computing a distance between the client device and the shopping cart at the timestamp associated with the action event, wherein each distance is computed based on the received device sensor data and the received cart sensor data;
determining whether to associate the user of the client device with the plurality of action events based on the plurality of distances by determining whether a threshold number of action events occurred while the client device is within a threshold distance of the shopping cart, wherein the threshold number of action events is greater than one;
responsive to determining to associate the user of the client device with the plurality of action events based on the plurality of distances, establishing a session between a user corresponding to the client device and the shopping cart; and
assigning, in a session database stored on a server of an online system, a unique session identifier to the shopping cart, the user, and the plurality of action events.

2. The method of claim 1, wherein the device sensor data or the cart sensor data comprises at least one of: GPS data, Bluetooth data, accelerometer data, WiFi data, image data, sound data, or near-field communication data.

3. The method of claim 1, wherein the first set of sensors are a same set of sensors as the second set of sensors.

4. The method of claim 1, wherein the action event comprises an item added to a storage area of the shopping cart.

5. The method of claim 1, wherein the action event comprises a movement of the shopping cart.

6. The method of claim 1, wherein the action event comprises an interaction with a display of the shopping cart.

7. The method of claim 1, further comprising:
associating one or more actions with the user based on the unique session identifier.

8. The method of claim 1, further comprising:
establishing a session between a user of the client device based on the plurality of distances of another client device from the shopping cart.

9. The method of claim 1, further comprising:
displaying a recipe suggestion on a display of the shopping cart based on the established session.

10. The method of claim 1, wherein the plurality of distances of the client device are determined based on signal strength data described in the device sensor data or the cart sensor data.

11. A non-transitory, computer-readable medium storing instructions that, when executed by a processor, cause the processor to:
receive device sensor data describing a set of measurements of a client device by a first set of sensors, wherein the client device is associated with a user;
receive cart sensor data describing a set of measurements of a shopping cart by a second set of sensors coupled to the shopping cart;
detect a plurality of action events based on the cart sensor data, wherein each action event indicates an action has been taken with respect to the shopping cart, and wherein each action event is associated with a timestamp;
determine a plurality of distances by, for each of the plurality of action events, computing a distance between the client device and the shopping cart at the timestamp associated with the action event, wherein each distance is computed based on the received device sensor data and the received cart sensor data;
determine whether to associate the user of the client device with the plurality of action events based on the plurality of distances by determining whether a threshold number of action events occurred while the client device is within a threshold distance of the shopping cart, wherein the threshold number of action events is greater than one;
responsive to determining to associate the user of the client device with the plurality of action events based on the plurality of distances, establish a session between a user corresponding to the client device and the shopping cart; and assign, in a session database stored on a server of an online system, a unique session identifier to the shopping cart, the user, and the plurality of action events.

12. The computer-readable medium of claim 11, wherein the device sensor data or the cart sensor data comprises at least one of: GPS data, Bluetooth data, accelerometer data, WiFi data, image data, sound data, or near-field communication data.

13. The computer-readable medium of claim 11, wherein the first set of sensors are a same set of sensors as the second set of sensors.

14. The computer-readable medium of claim 11, wherein the action event comprises an item added to a storage area of the shopping cart.

15. The computer-readable medium of claim 11, wherein the action event comprises a movement of the shopping cart.

16. The computer-readable medium of claim 11, wherein the action event comprises an interaction with a display of the shopping cart.

17. The computer-readable medium of claim 11, further storing instructions that cause the processor to:
associate one or more actions with the user based on the unique session identifier.

18. The computer-readable medium of claim 11, further storing instructions that cause the processor to:
establish a session between a user of the client device based on the plurality of distances of another client device from the shopping cart.

19. The computer-readable medium of claim 11, further storing instructions that cause the processor to:
display a recipe suggestion on a display of the shopping cart based on the established session.

20. A system comprising:
a processor; and a non-transitory, computer-readable medium storing instructions that, when executed by a processor, cause the processor to:
receive device sensor data describing a set of measurements of a client device by a first set of sensors, wherein the client device is associated with a user;
receive cart sensor data describing a set of measurements of a shopping cart by a second set of sensors coupled to the shopping cart;
detect a plurality of action events based on the cart sensor data, wherein each action event indicates an action has been taken with respect to the shopping cart, and wherein each action event is associated with a timestamp;
determine a plurality of distances by, for each of the plurality of action events, computing a distance between the client device and the shopping cart at the timestamp associated with the action event, wherein each distance is computed based on the received device sensor data and the received cart sensor data;
determine whether to associate the user of the client device with the plurality of action events based on the plurality of distances by determining whether a threshold number of action events occurred while the client device is within a threshold distance of the shopping cart, wherein the threshold number of action events is greater than one;
responsive to determining to associate the user of the client device with the plurality of action events based on the plurality of distances, establish a session between a user corresponding to the client device and the shopping cart; and
assign, in a session database stored on a server of an online system, a unique session identifier to the shopping cart, the user, and the plurality of action events.

* * * * *